(12) United States Patent
Park et al.

(10) Patent No.: US 9,161,317 B2
(45) Date of Patent: Oct. 13, 2015

(54) TRANSMISSION POWER REPORTING METHOD AND APPARATUS

(75) Inventors: Sung Jun Park, Gyeonggi-do (KR);
Seung June Yi, Gyeonggi-do (KR);
Sung Duck Chun, Gyeonggi-do (KR);
Young Dae Lee, Gyeonggi-do (KR);
Sung Hoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 188 days.

(21) Appl. No.: 13/883,607

(22) PCT Filed: Nov. 8, 2011

(86) PCT No.: PCT/KR2011/008444
§ 371 (c)(1),
(2), (4) Date: May 6, 2013

(87) PCT Pub. No.: WO2012/064069
PCT Pub. Date: May 18, 2012

(65) Prior Publication Data
US 2013/0225228 A1 Aug. 29, 2013

Related U.S. Application Data

(60) Provisional application No. 61/411,441, filed on Nov. 8, 2010.

(51) Int. Cl.
*H04W 52/24* (2009.01)
*H04W 24/10* (2009.01)
*H04L 5/00* (2006.01)

(52) U.S. Cl.
CPC ............ *H04W 52/243* (2013.01); *H04W 24/10* (2013.01); *H04L 5/001* (2013.01); *H04L 5/0055* (2013.01); *Y02B 60/50* (2013.01)

(58) Field of Classification Search
CPC . H04W 52/146; H04W 52/14; H04W 52/143; H04W 52/04; H04W 52/06; H04W 52/08; H04W 52/10; H04W 52/12; H04W 52/16; H04W 52/18; H04W 52/30; H04W 52/38; H04W 52/362; H04W 52/367; H04W 52/365

USPC .......... 455/69, 522, 13.1, 436, 422, 432, 526, 455/67.1, 13.4, 517, 507, 509, 515, 516; 370/311, 252, 335, 342, 318, 336, 332, 370/333, 320
See application file for complete search history.

(56) References Cited

U.S. PATENT DOCUMENTS 6,393,005 B1 * 5/2002 Mimura ........................ 370/335
6,925,286 B1 * 8/2005 Kraiem et al. ............... 455/13.4

(Continued)

FOREIGN PATENT DOCUMENTS

KR 10-2010-0072242 A 6/2010

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 9)," 3GPP TS 36.321 V9.3.0 Jun. 2010.

(Continued)

*Primary Examiner* — Tan Trinh
(74) *Attorney, Agent, or Firm* — Morgan, Lewis & Bockius LLP

(57) ABSTRACT

Provided are a transmission power reporting method and apparatus. A terminal determines a configured maximum transmission power based on a maximum power reduction (MPR) and transmission power configured by a base station and determines whether reporting of the configured maximum transmission power is triggered. If reporting of the configured maximum transmission power is triggered, the terminal transmits a reporting message including the configured maximum transmission power to the base station.

11 Claims, 10 Drawing Sheets

(56) References Cited

U.S. PATENT DOCUMENTS

| | | | |
|---|---|---|---|
| 7,920,890 B2* | 4/2011 | Iwata | 455/522 |
| 2003/0193913 A1* | 10/2003 | Murata et al. | 370/332 |
| 2003/0218995 A1* | 11/2003 | Kim et al. | 370/318 |
| 2006/0094372 A1* | 5/2006 | Ahn et al. | 455/67.13 |
| 2009/0042596 A1* | 2/2009 | Yavuz et al. | 455/522 |
| 2009/0191910 A1 | 7/2009 | Athalye et al. | |
| 2010/0216473 A1 | 8/2010 | Kazmi et al. | |
| 2010/0255847 A1* | 10/2010 | Lee et al. | 455/436 |
| 2011/0105173 A1* | 5/2011 | Haim et al. | 455/522 |
| 2012/0046026 A1* | 2/2012 | Chande et al. | 455/422.1 |
| 2012/0082043 A1* | 4/2012 | Hwang et al. | 370/252 |
| 2012/0082046 A1* | 4/2012 | Ho et al. | 370/252 |
| 2012/0275381 A1* | 11/2012 | Kim et al. | 370/328 |
| 2013/0100846 A1* | 4/2013 | Park et al. | 370/252 |

OTHER PUBLICATIONS

HTC, "Power Headroom Reporting," 3GPP TSG-RAN WG1 #61, R1-102732, May 10-14, 2010.

Search Report issued in corresponding International Patent Application No. PCT/KR2011/008444 dated Apr. 26, 2012.

Office Action dated Feb. 27, 2015, issued by the State Intellectual Property Office of China in Chinese Patent Application No. 201180053892.6.

* cited by examiner

TRANSMISSION POWER REPORTING METHOD AND APPARATUS

BACKGROUND OF THE INVENTION

1. Field of the Invention

The present invention relates to wireless communication and, more particularly, to a method and apparatus for reporting transmission power of a terminal in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In order to mitigate interference due to uplink transmission, transmission power of a terminal is required to be regulated. If transmission power of a terminal is too low, it is difficult for a base station (BS) to receive uplink data. If transmission power of a terminal is too high, uplink transmission may cause excessive interference to transmission of other terminals.

In order to recognize uplink transmission power of a terminal, the terminal reports power headroom to a BS. However, power headroom is merely a difference between maximum transmission power and transmission power to be used. Thus, if a terminal arbitrarily limits transmission power, a BS may not be able to accurately recognize available transmission power of the terminal.

SUMMARY OF THE INVENTION

An aspect of the present invention provides a method and apparatus for allowing a report of transmission power to be triggered, and reporting triggered transmission power.

In an aspect, a method for reporting a transmission power in a wireless communication system is provided. The method includes determining a configured maximum transmission power based on a transmission power configured by a base station (BS) and a maximum power reduction (MPR), determining whether reporting of the configured maximum transmission power is triggered, and when reporting of the configured maximum transmission power is triggered, transmitting a report message including the configured maximum transmission power to the BS.

The method may further includes determining a power headroom that indicates a difference between the configured maximum transmission power and a transmission power to be used for uplink transmission. The report message may further include the power headroom.

When reporting of the configured maximum transmission power is configured or reconfigured, reporting of the configured maximum transmission power may be triggered.

When the configured maximum transmission power after last reported configured maximum transmission power is changed to be greater than a threshold value, reporting of the configured maximum transmission power may be triggered.

When the configured maximum transmission power is changed to be greater than a threshold value after a prohibit timer expires, reporting of the configured maximum transmission power may be triggered. When reporting of the configured maximum transmission power is triggered, the prohibit timer may start.

When a periodic timer expires, reporting of the configured maximum transmission power may be triggered. The periodic timer may start when reporting of the configured maximum transmission power is triggered.

When limited use of transmission power is detected, reporting of the configured maximum transmission power may be triggered.

When there is an allocated uplink resource, reporting of the configured maximum transmission power may be triggered.

In another aspect, a user equipment configured for reporting a transmission power in a wireless communication system is provided. The user equipment includes a radio frequency (RF) unit configured to transmit and receive a radio signal, and a processor operably connected to the RF unit and configured to determine a configured maximum transmission power based on a transmission power configured by a base station (BS) and a maximum power reduction (MPR), determine whether reporting of the configured maximum transmission power is triggered, and when reporting of the configured maximum transmission power is triggered, transmit a report message including the configured maximum transmission power to the BS.

A BS can more accurately recognize a transmission power of a UE to precisely control uplink power. Interference between UEs can be miotigated.

DESCRIPTION OF EXEMPLARY EMBODIMENTS

Figure 1:
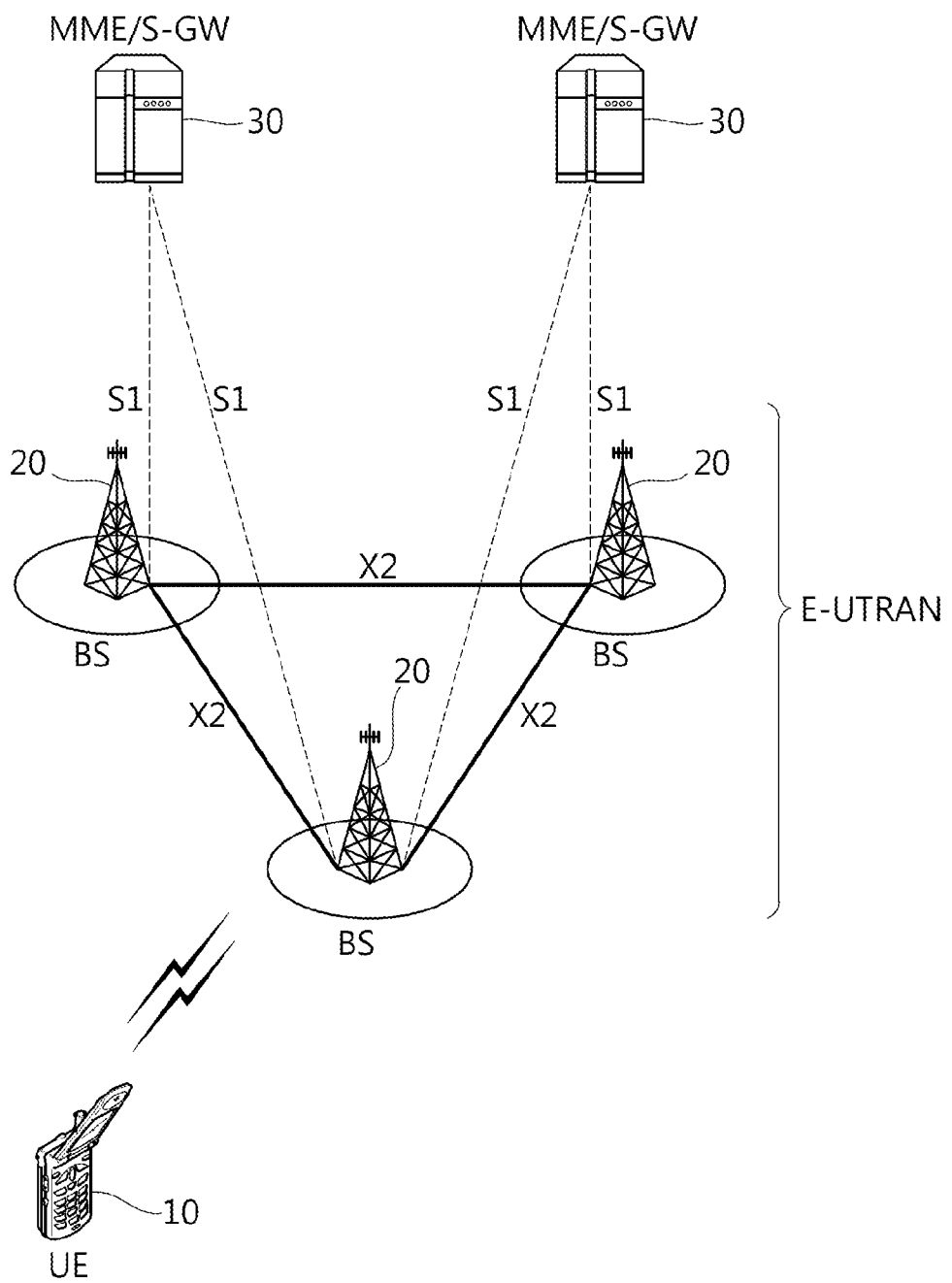
FIG. 1 is a view illustrating a wireless communication system to which the present invention is applicable.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
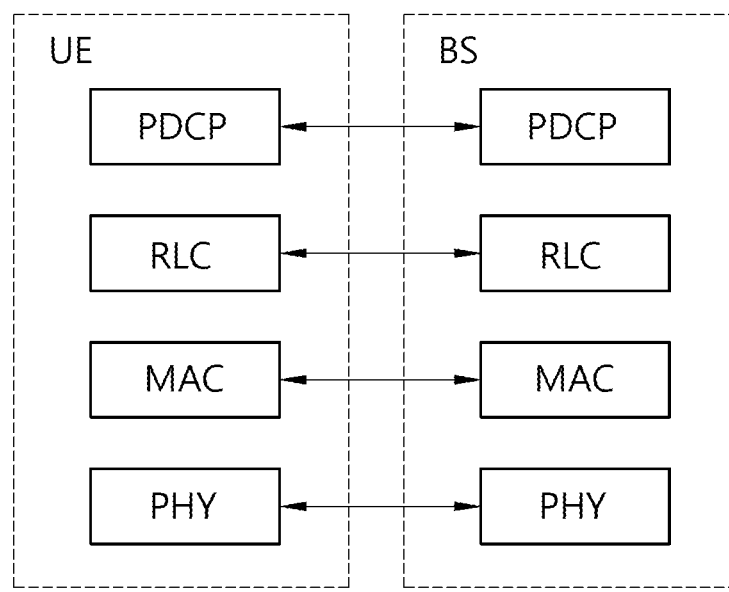
FIG. 2 is a diagram showing a radio protocol architecture for a user plane.
Figure 3:
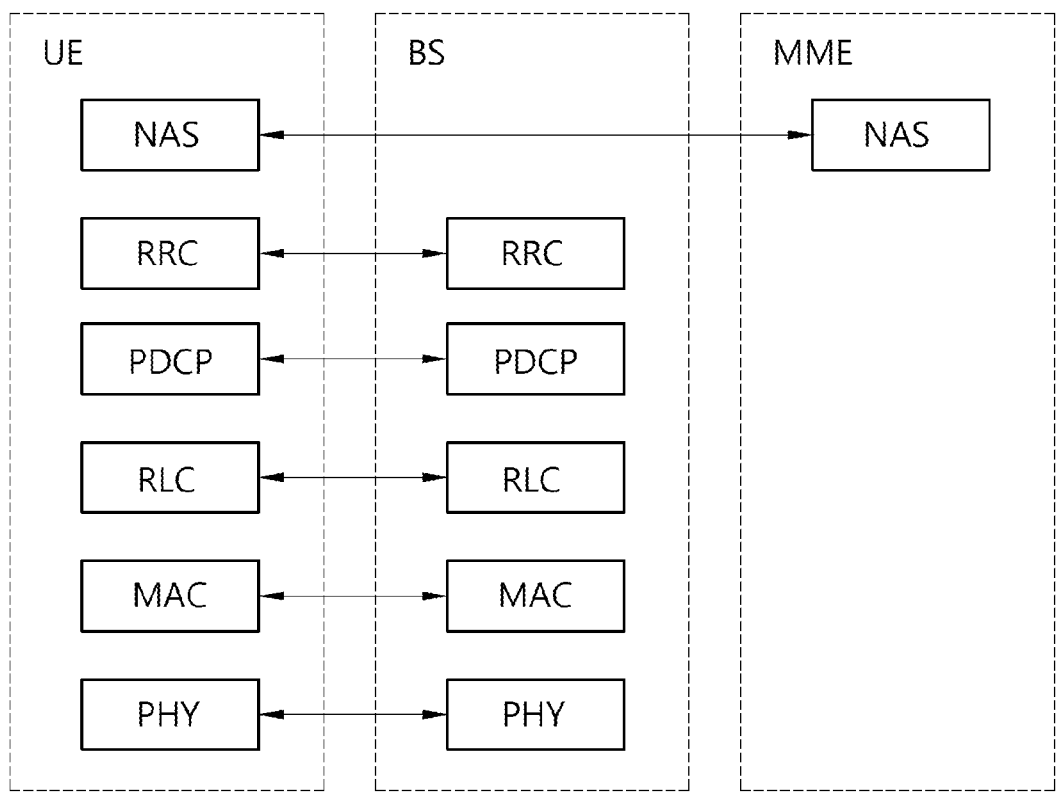
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Now, a multiple carrier system will be described.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
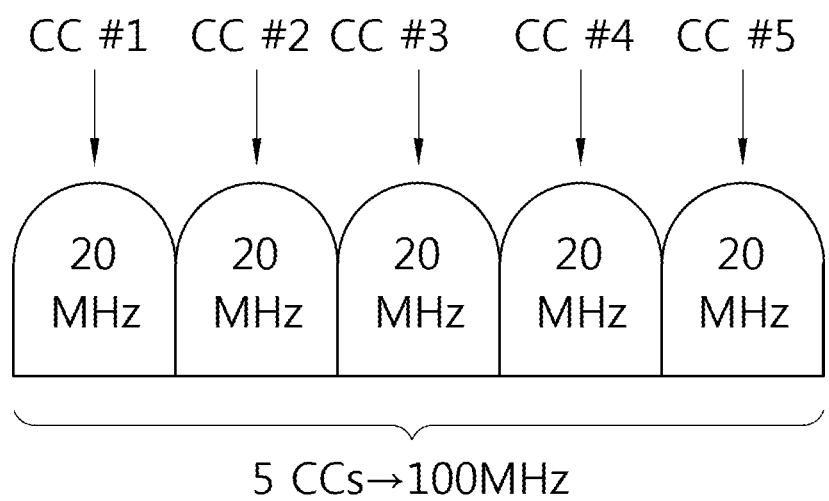
FIG. 4 is a diagram showing an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
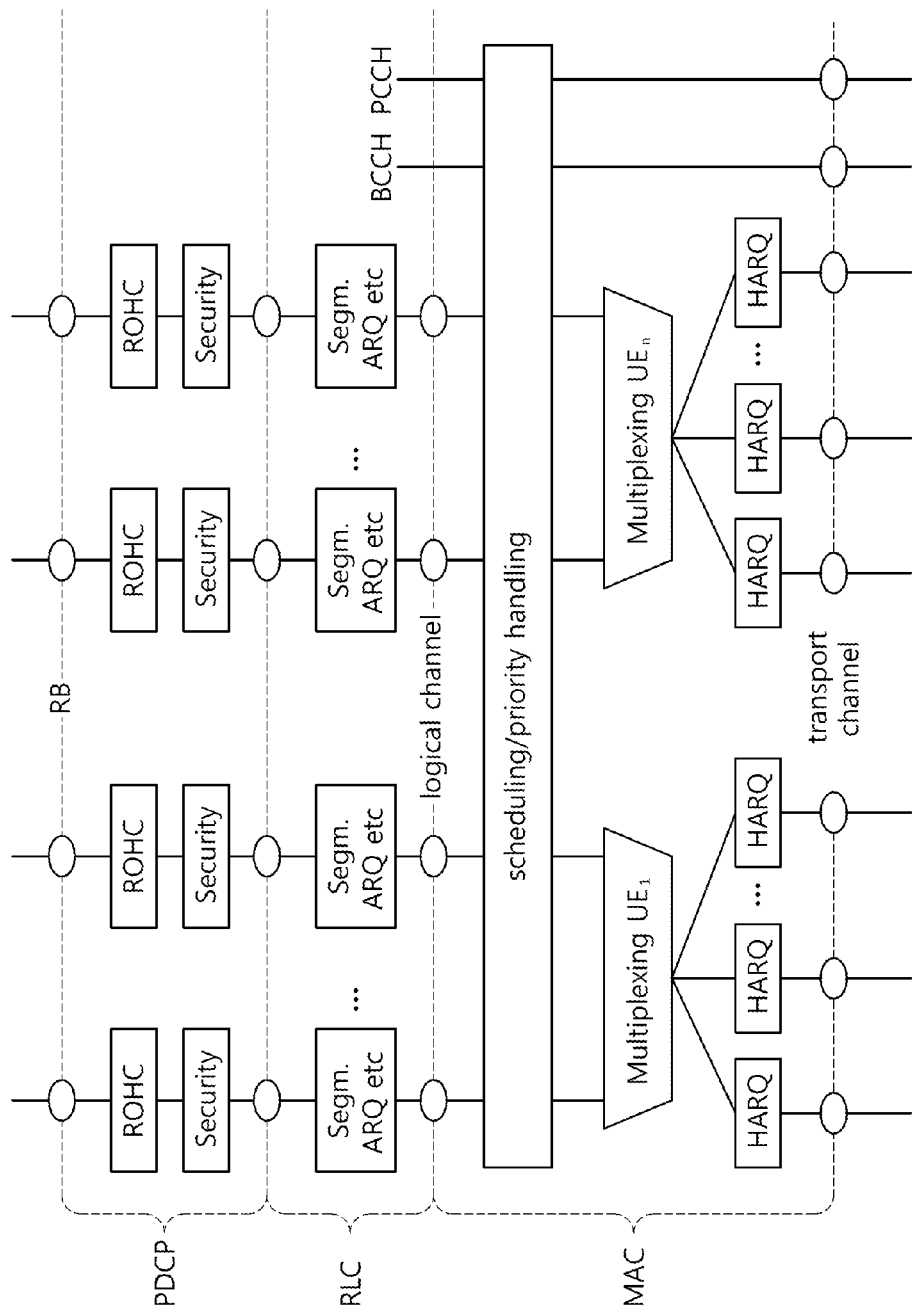
FIG. 5 is a diagram showing a structure of a second layer of a base station (BS) for multiple carriers.
Figure 6:
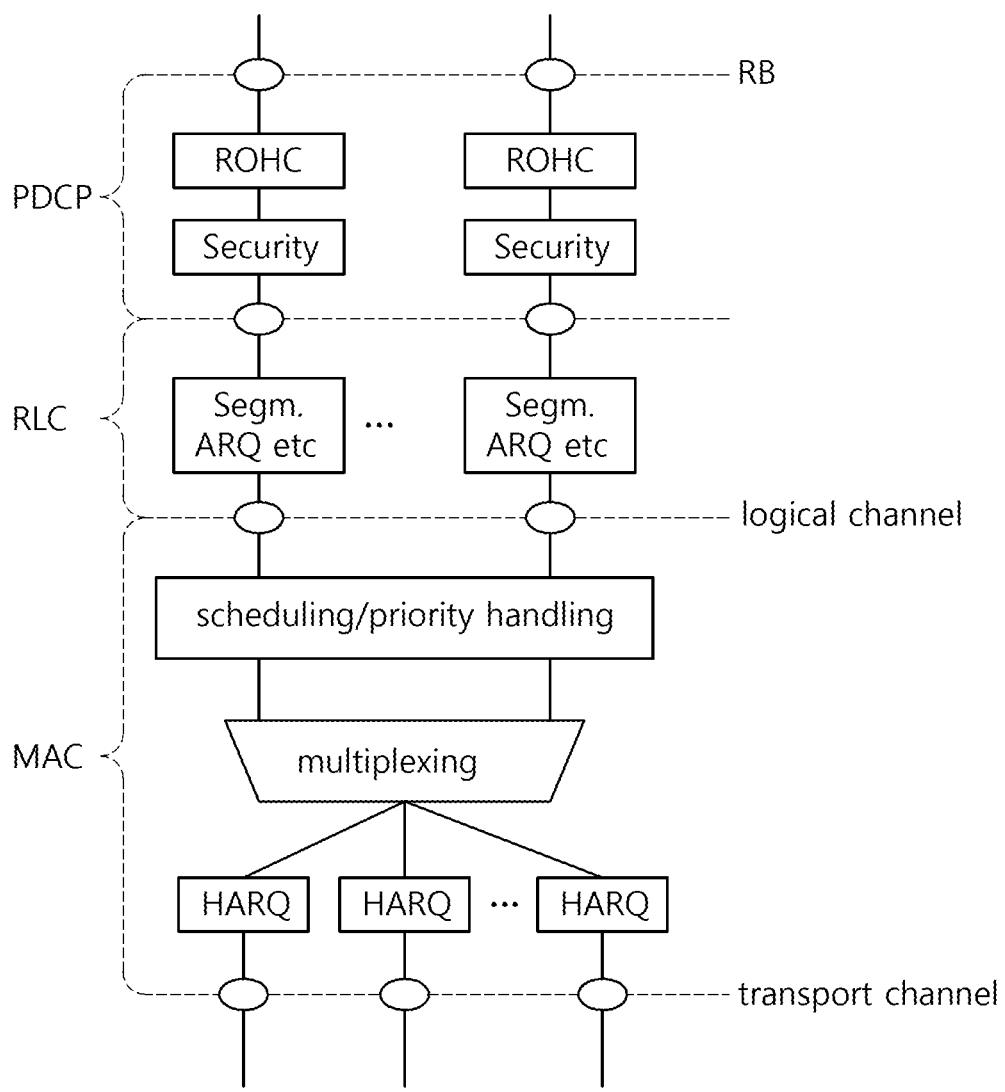
FIG. 6 is a diagram showing a structure of a second layer of a terminal for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel.

Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

A cell may be classified into a primary cell and a secondary cell. The primary cell is operated in a primary frequency and is a cell in which the initial connection establishment procedure is performed, the connection re-establishment procedure is initiated. A cell may be designated as a primary cell during handover. The primary cell may also be referred to as a reference cell. The secondary cell may be operated in a secondary frequency and may be configured once an RRC connection is established and may be used to provide additional radio resources. At least one primary cell may be configured and zero or more secondary cell may be added/modified/released via a higher layer signaling.

Next, a power headroom reporting will be disclosed.

To mitigate interference due to UL transmission, a transmit power of a UE needs to be adjusted. If the transmit power of the UE is too low, the BS barely receive UL data. If the transmit power of the UE is too high, the UL transmission may give too much interference to other UE's transmission.

A power headroom reporting procedure is used to provide the serving BS with information about the difference between the nominal UE maximum transmit power and the estimated power for UL-SCH transmission. RRC controls the power headroom reporting by configuring the two timers, a periodic timer and prohibit timer, and by signaling a pathloss threshold which sets the change in measured downlink pathloss to trigger the power headroom reporting.

A power headroom may be defined as a residual power that can be additionally used from a current transmit power. The power headroom can be represented as a difference between a configured maximum transmit power and the current transmit power.

According to the section 5.1.1 of 3GPP TS 36.213 V8.8.0 (2009 September) "Evolved Universal Terrestrial Radio Access (E-UTRA); Physical layer procedures (Release 8)", a power headroom PH(i) valid for subframe i is defined by:

$$PH(i)=P_{CMAX}-\{10 \log_{10}(M_{PUSCH}(i))+P_{O\_PUSCH}(j)+\alpha(j)PL+\Delta_{TF}(i)+f(i)\}$$ [Equation 1]

where, $P_{CMAX}$ is a configured maximum UE transmitted power, $M_{PUSCH}(i)$ is the bandwidth of the PUSCH resource assignment expressed in number of resource blocks valid for subframe i, PL is a downlink pathloss estimate calculated in the UE, and $P_{O\_PUSCH}(j)$, $\alpha(j)$, $\Delta TF(j)$ and $f(i)$ are parameters obtained from higher layer signaling.

A power headroom report (PHR) may be triggered if any of the following events occur:
 a prohibit timer expires or has expired and the pathloss has changed more than the pathloss threshold since the transmission of a PHR when UE has UL resources for new transmission;
 a periodic timer expires;
 upon configuration or reconfiguration of the power headroom reporting functionality by upper layers, which is not used to disable the function.

If the UE has UL resources allocated for new transmission for this TTI, the UE obtains the value of the power headroom from the physical layer and transmits a PHR MAC control element based on the value reported by the physical layer. The UE starts or restarts the periodic timer.

The power headroom is transmitted as a MAC control element. A power headroom field in the MAC control element includes 6 bits.

Maximum transmission power $P_{CMAX}$ set in the UE is obtained by applying maximum power reduction (MPR) to uplink transmission power $P_{EMAX}$ of the UE given by the BS. Namely, $P_{CMAX}<(P_{EMAX}-MPR)$.

The MPR may be a maximum lower limit value of maximum output power defined for the UE to reduce power. The UE may reduce power within an allowable value of the MPR, and subsequently transmit a signal to the BS. A difference between average power and maximum power is increased due to a high order modulation scheme such as 16-QAM and a large number of resource blocks (RB) to lower power efficiency. Thus, in order to overcome low power efficiency and facilitate designing of a power amplifier of a UE, MPR has been introduced.

Paragraph 6.2 of 3GPP TS 36.101 V8.7.0 (2009 September) defines MPR based on modulation schemes and resource blocks as follows.

TABLE 1

| Modulation scheme | Channel bandwidth (RB) | | | | | | MPR (dB) |
| --- | --- | --- | --- | --- | --- | --- | --- |
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

As described above, the UE subtracts transmission power to be currently used from maximum transmission power set by applying MPR thereto, and calculates power headroom in consideration of other factors such as a pathloss additionally. The transmission power to be currently used is calculated in consideration of resource blocks of allocated uplink resources and a modulation scheme.

The UE may arbitrarily employ MPR to reduce transmission power according to an implementation thereof. Namely, the BS cannot know an MPR value employed by the UE, which means that the BS cannot accurately determine maximum output power of the UE. Thus, the UE may derive how may power the UE has reduced according to transmission power the BS has allocated to the UE, on the basis of power headroom.

However, with a plurality of serving cells introduced, when a UE simply report power headroom, a BS may not be able to estimate transmission power of the UE properly.

Hereinafter, it is assumed that a UE has two serving cells, but the number of serving cells is not limited.

For clarification, it is assumed that maximum output power of a UE, maximum output power of the UE with respect to a serving cell 1, and maximum output power of the UE with respect to a serving cell 2 are all equal.

Terms are defined in subframe i as follows.

$P_c$: is transmission power used for uplink transmission by UE in serving cell c, $PH_c$: power headroom in serving cell c, $PH_{UE}$: remaining transmission power obtained by subtracting uplink transmission power with respect to each serving cell from maximum output power of UE, $P^*_c$: transmission power requested by BS from UE with respect to serving cell c, $P_{SD,c}$: an amount of power reduced by UE to perform transmission at level lower than UE transmittable power, when transmission power requested by BS is greater than UE transmittable power.

Figure 7:
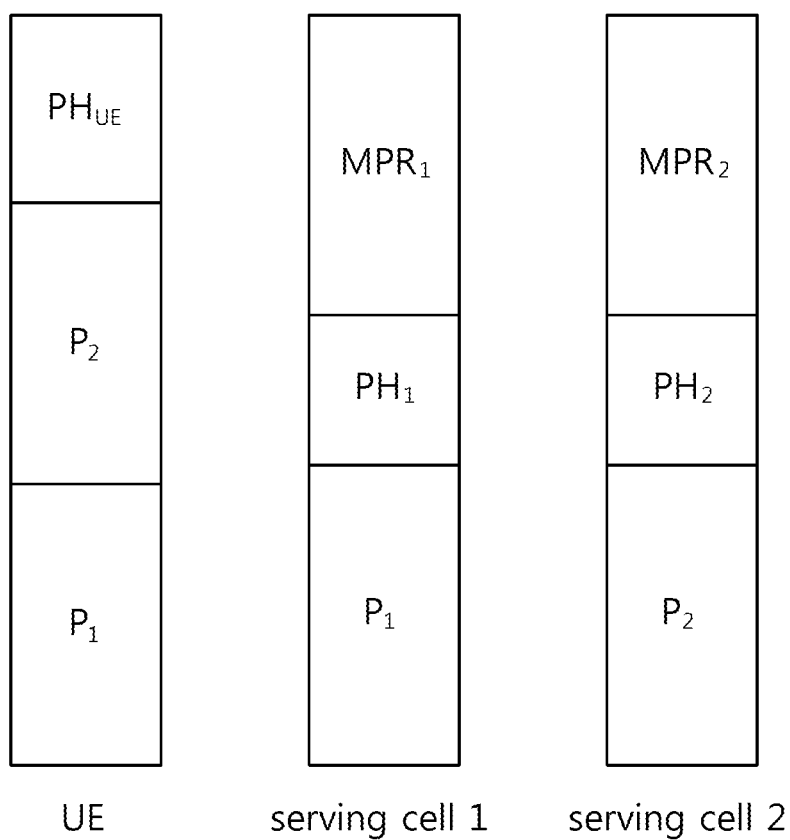
FIG. 7 is a diagram showing an example of a power headroom report.

FIG. 7 is a diagram showing an example of a power headroom report.

Same power headroom values $PH_1$ and $PH_2$ are determined for two serving cells. When PHR is triggered, the UE reports $PH_1$ and $PH_2$ to the BS.

Transmission power sum $P_1+P_2$ with respect to the two serving cells is smaller than the maximum output power of the UE, so the UE has extra transmission power $PH_{UE}$.

Figure 8:
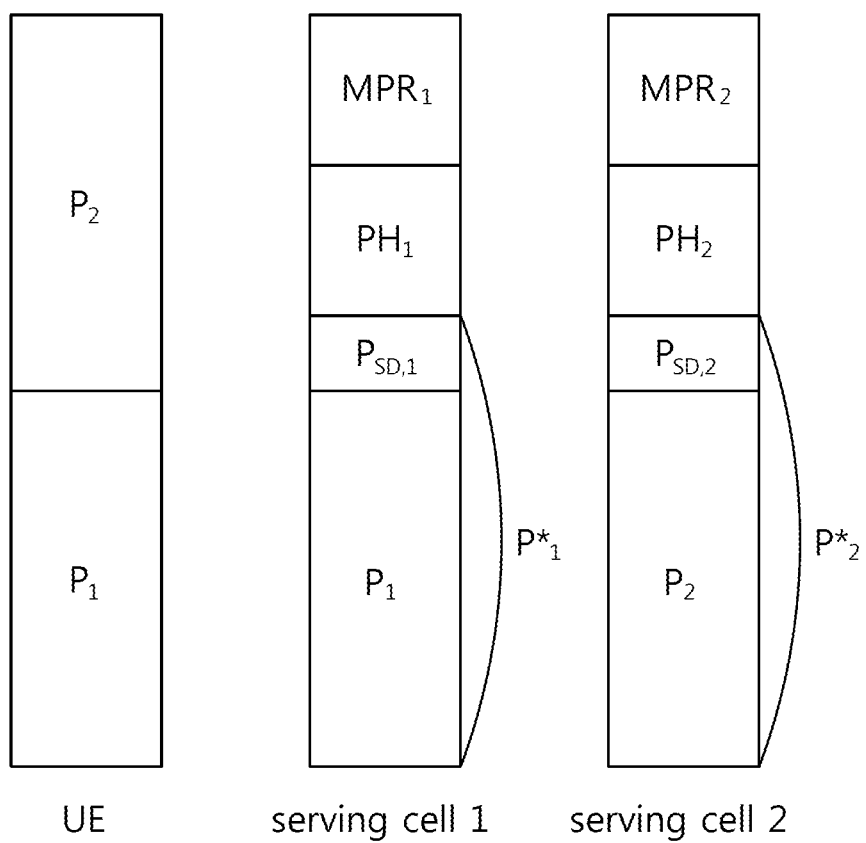
FIG. 8 is a diagram illustrating an example of a problem caused by a power headroom report.

FIG. 8 is a diagram showing an example of a problem caused by a power headroom report.

It is assumed that a UE has superior capability so it can have smaller MPR, relative to the example of FIG. 7. The UE determines power headroom $PH_1$ and $PH_2$, in consideration of transmission power $P^*_1$ and $P^*_2$ requested by a BS from the UE.

Since the sum of transmission power requested by the BS in each serving cell is greater than maximum output power, $P_1$ and $P_2$ obtained by reducing power by $P_{SD,1}$ or $P_{SD,2}$ with respect to each serving cell are used as actual transmission power. In this case, extra output does not remain in terms of maximum output power of the UE ($PH_{UE}=0$).

In the examples of FIG. 7 and FIG. 8, the power headroom values $PH_1$, $PH_2$ reported according to MPR of the UE are equal, but actual extra transmission power of the UE is different. Namely, in the example of FIG. 7, the UE has extra power, but in the example of FIG. 8, the UE does not have extra power.

This is because power headroom is determined for each serving cell. Thus, reporting of maximum transmission power set for each serving, together with power headroom with respect to each serving cell has been proposed. Extended PHR includes power headroom $PH_C$ with respect to the serving cell c and maximum transmission power $P_{CMAX,c}$ set for the serving cell c.

However, even with the extended PHR, power headroom is reported only when triggered, so it is difficult for the BS to accurately determine a power state of the UE.

The present invention proposes a method for triggering and reporting pre-set maximum transmission power $P_{CMAX,c}$. A condition for triggering reporting of transmission power may be set independently from a condition of triggering PHR.

When reporting of pre-set maximum transmission power is triggered, the UE may trigger PHR. Namely, MAC CE for PHR may include $P_{cmax,c}$.

PHR is triggered as reporting of the pre-set maximum transmission power is triggered, but when there is no uplink radio resource for PHR, the UE may transmit a scheduling request to the BS. If there is no PUCCH (Physical Uplink Control Channel) resource for a scheduling request, the UE may start a random access process.

When uplink resource is allocated in response to the scheduling request or a random access, the UE may report the pre-set maximum transmission power to the BS by using the allocated uplink resource.

Figure 9:
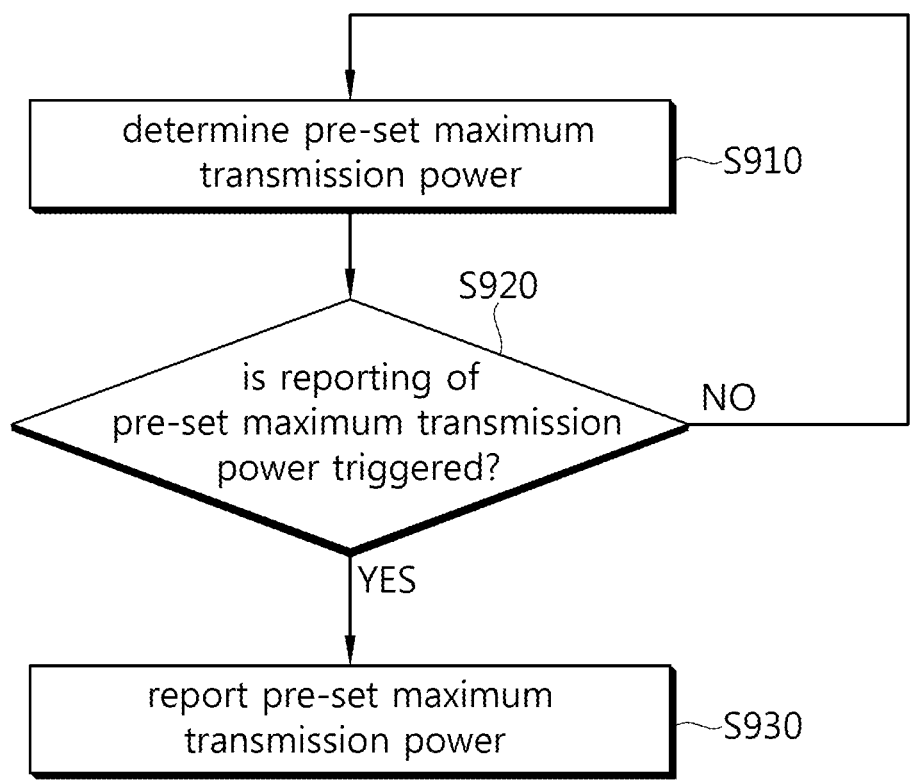
FIG. 9 is a flow chart illustrating a method for reporting transmission power according to an embodiment of the present invention.

FIG. 9 is a flow chart illustrating a method for reporting transmission power according to an embodiment of the present invention.

A UE determines a configured maximum transmission power $P_{cmax,c}$ for each serving cell on the basis of transmission power set by a BS and MPR (S910). The UE may determine a power headroom on the basis of the pre-set maximum transmission power.

The UE determines whether reporting of the pre-set maximum transmission power is triggered (S920).

Triggering conditions may be at least any one of the following conditions.

In a first condition, when the BS configures or reconfigures report setting for reporting $P_{cmax,c}$, $P_{cmax,c}$ reporting may be triggered. The BS may configure/reconfigure report setting by serving cells or UEs. The report setting may include information regarding a timer (a prohibit timer or a periodic timer) and/or a threshold value. The BS may transmit the report setting to the UE through an RRC message or a MAC message.

In a second condition, after the terminal finally transmits $P_{cmax,c}$, when $P_{cmax,c}$ is changed by more than a threshold value, $P_{cmax,c}$ reporting may be triggered. Also, the triggering conditions may be limited to a case in which the UE is allocated uplink radio resource. After the UE finally transmits $P_{cmax,c}$, when $P_{cmax,c}$ is changed to be greater than a threshold value and new uplink radio resource is allocated, $P_{cmax,c}$ reporting may be triggered.

In a third condition, the prohibit timer may be used. The prohibit timer starts when $P_{cmax,c}$ reporting is triggered. While the prohibit timer is being operated, $P_{cmax,c}$ reporting is prohibited. After the prohibit timer expires and after the finally transmitted $P_{cmax,c}$, when $P_{cmax,c}$ is changed to be greater than a threshold value, $P_{cmax,c}$ reporting may be triggered.

In a fourth condition, a periodic timer may be used. The periodic timer starts when $P_{cmax,c}$ reporting is triggered. When the periodic timer expires, $P_{cmax,c}$ reporting may be triggered.

In a fifth condition, when the UE should use power limitedly, $P_{cmax,c}$ reporting may be triggered. In a case in which transmission power requested by the BS is greater than maximum output power of the UE, the UE lowers transmission power requested by the BS to have a level lower than maximum transmission power of the UE. In this case, the UE should limitedly use power. Or, when the sum of transmission power requested by the UE with respect to each serving cell is greater than the maximum transmission power of the UE, the UE should limitedly use power. The UE should lower the sum of transmission power requested by the BS with respect to each serving cell to have a level lower than the maximum transmission power of the UE and perform transmission.

In a sixth condition, when the UE is allocated new uplink resource from the BS, $P_{cmax,c}$ reporting may be triggered. When transmission power is determined according to new uplink resource, $P_{cmax,c}$ may differ.

When reporting of the pre-set maximum transmission power is triggered, the UE transmits a report message including the pre-set maximum transmission power $P_{cmax,c}$ to the BS (S930). The report message may further include power headroom. The report message may be transmitted as a MAC CE.

When reporting of the pre-set maximum transmission power is triggered, if there is no uplink resource for the report message, the UE may transmit a scheduling request or starts a random access process.

As the triggering condition for reporting $P_{cmax,c}$ is proposed, the BS may recognize transmission power set by the UE at a desired timing. Thus, uplink power can be more accurately controlled and inter-UE interference in uplink transmission can be mitigated.

Figure 10:
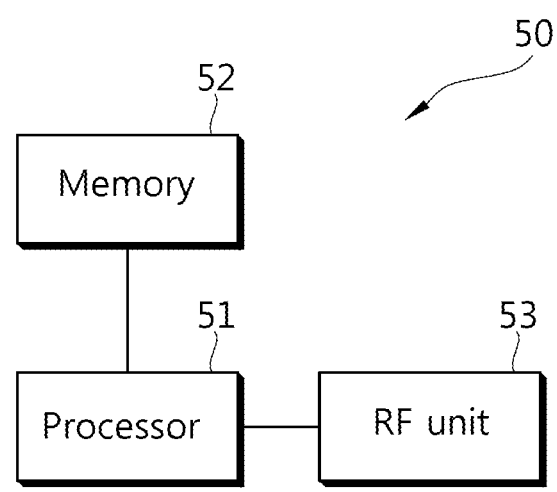
FIG. 10 is a block diagram of a wireless device implementing an embodiment of the present invention.

FIG. 10 is a block diagram of a wireless device implementing an embodiment of the present invention. The device may implement an operation of the UE in the embodiment of FIG. 9.

A UE 50 includes a processor 51, a memory 52, and a radio frequency (RF) unit 53. The memory 52 connected to the processor 51 stores various types of information for driving the processor 51. The RF unit 53 connected to the processor 51 transmits and/or receives a radio signal. The processor 51 implements proposed functions, processes, and/or methods. An operation of the UE in the embodiment of FIG. 9 may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a transmission power in a wireless communication system, performed by a user equipment, the method comprising:
    determining a configured maximum transmission power based on a transmission power configured by a base station and a maximum power reduction (MPR);
    determining a power headroom that indicates a difference between the configured maximum transmission power and a transmission power to be used for uplink transmission;
    determining whether reporting of the configured maximum transmission power is triggered; and
    when reporting of the configured maximum transmission power is triggered, transmitting a report message including the configured maximum transmission power to the base station,
    wherein, when reporting of the configured maximum transmission power is reconfigured by the base station, the reporting of the configured maximum transmission power is triggered, and
    wherein the report message includes the configured maximum transmission power together with the power headroom.

2. The method of claim 1, wherein the report message is a medium access control (MAC) control element (CE).

3. The method of claim 1, further comprising:
    transmitting a scheduling request for transmission of the report message to the base station; and
    receiving uplink resource from the base station in response to the scheduling request,
    wherein the report message is transmitted by using the uplink resource.

4. The method of claim 1, wherein, when the configured maximum transmission power after last reported configured maximum transmission power is changed to be greater than a threshold value, reporting of the configured maximum transmission power is further triggered.

5. The method of claim 1, wherein:
    when the configured maximum transmission power is changed to be greater than a threshold value after a prohibit timer expires, reporting of the configured maximum transmission power is further triggered; and
    when reporting of the configured maximum transmission power is triggered, the prohibit timer starts.

6. The method of claim 1, wherein:
    when a periodic timer expires, reporting of the configured maximum transmission power is triggered; and
    the periodic timer starts when reporting of the configured maximum transmission power is further triggered.

7. The method of claim 1, wherein, when limited use of transmission power is detected, reporting of the configured maximum transmission power is further triggered.

8. The method of claim 1, wherein, when there is an allocated uplink resource, reporting of the configured maximum transmission power is further triggered.

9. A user equipment configured for reporting a transmission power in a wireless communication system, the user equipment comprising:
    a radio frequency (RF) unit configured to transmit and receive a radio signal; and
    a processor operably connected to the RF unit and configured to:
        determine a configured maximum transmission power based on a transmission power configured by a base station and a maximum power reduction (MPR);
        determine a power headroom that indicates a difference between the configured maximum transmission power and a transmission power to be used for uplink transmission;
        determine whether reporting of the configured maximum transmission power is triggered; and
        when reporting of the configured maximum transmission power is triggered, transmit a report message including the configured maximum transmission power to the base station,
    wherein, when reporting of the configured maximum transmission power is reconfigured by the base station, the reporting of the configured maximum transmission power is triggered, and
    wherein the report message includes the configured maximum transmission power together with the power headroom.

10. The user equipment of claim 9, wherein, when the configured maximum transmission power after last reported configured maximum transmission power is changed to be greater than a threshold value, reporting of the configured maximum transmission power is further triggered.

11. The user equipment of claim 9, wherein:
when the configured maximum transmission power is changed to be greater than a threshold value after a prohibit timer expires, reporting of the configured maximum transmission power is further triggered; and
when reporting of the configured maximum transmission power is triggered, the prohibit timer starts.

* * * * *